UNITED STATES PATENT OFFICE.

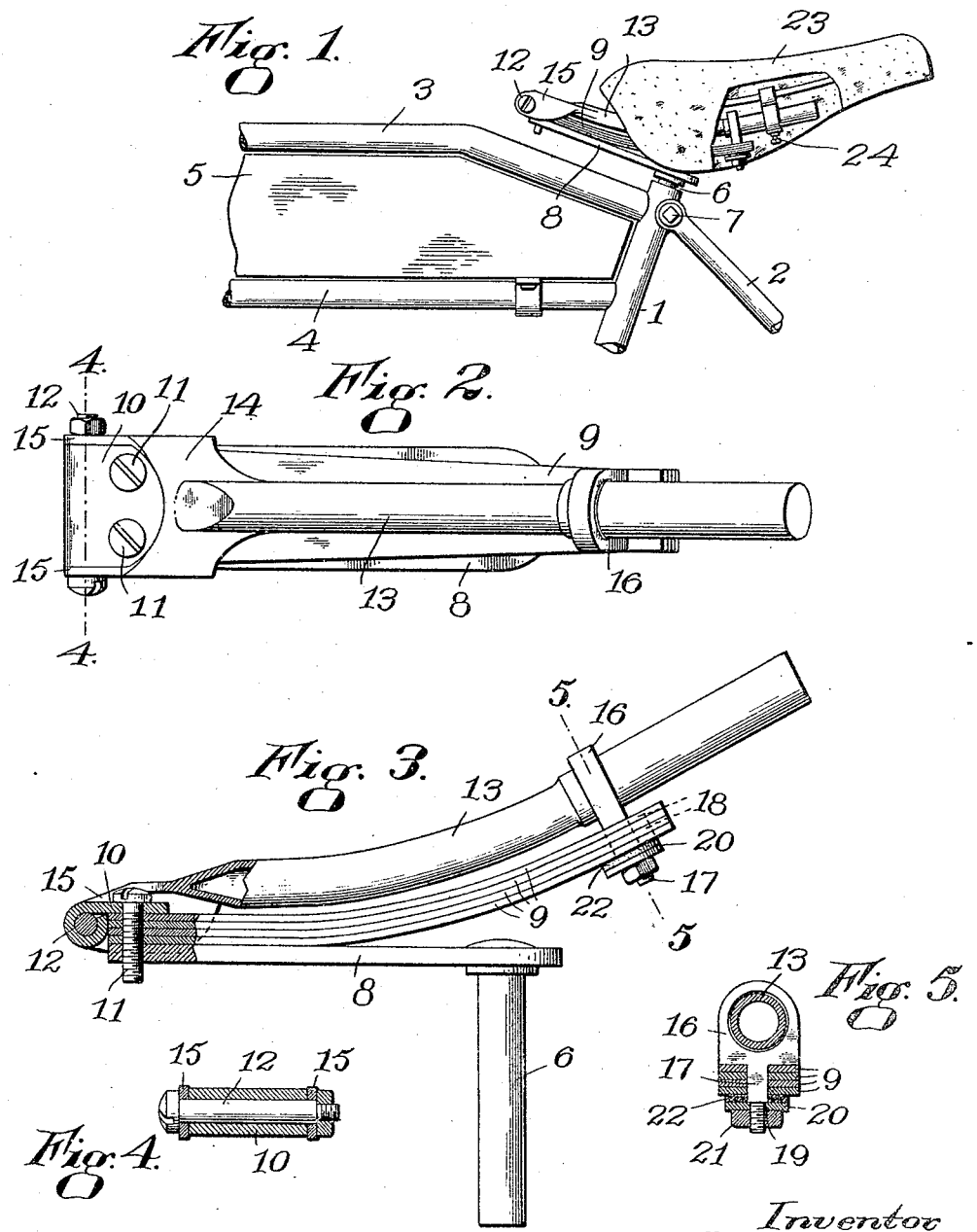

LYMAN H. COBB, OF FITCHBURG, MASSACHUSETTS, ASSIGNOR TO MARY ELIZABETH JOHNSON, TRUSTEE, OF FITCHBURG, MASSACHUSETTS.

RESILIENT SEAT-SUPPORT.

1,122,690.

Specification of Letters Patent.

Patented Dec. 29, 1914.

Application filed December 18, 1913. Serial No. 807,539.

*To all whom it may concern:*

Be it known that I, LYMAN H. COBB, a citizen of the United States, residing at Fitchburg, in the county of Worcester and Commonwealth of Massachusetts, have invented a new and useful Improvement in Resilient Seat-Supports, of which the following, together with the accompanying drawing, is a specification.

My invention relates to resilient supports for the seats of motorcycles, bicycles, and the like, and is particularly useful as embodied in a spring seat post adapted to be interposed between the frame of the machine and the ordinary seat or saddle.

Motorcycles, bicycles and the like, are usually sold provided with seats and seat posts which are rather rigid and uncomfortable and it is one object of the present invention to provide a resilient seat post adapted to be interposed between the frame of the machine and the seat originally furnished with the machine so that the machine may be ridden more comfortably without the necessity of purchasing a new and expensive spring seat.

Another object of the invention is to provide a simple form of resilient seat support so constructed that its resiliency may be adjusted in accordance with the weight of the rider and the unevenness of the surface over which the machine is to be ridden.

Other objects and advantages will appear from the following description taken in connection with the accompanying drawing, in which—

Figure 1 represents the upper portion of the frame of a motorcycle carrying a seat or saddle supported by a resilient seat support constructed in accordance with my invention; Fig. 2 is a plan view of the resilient seat support; Fig. 3 is a side view of the resilient seat support, the forward end being shown in section to show details of construction; Fig. 4 is a sectional view on the line 4—4 of Fig. 2; and Fig. 5 is a sectional view on the line 5—5 of Fig. 3.

Like reference characters refer to similar parts in the different figures.

As shown in the drawing, the frame of the motorcycle includes a seat post tube 1, a rear fork 2, a backbone 3 and a brace 4, the fuel tank 5 being supported between the backbone 3 and the brace 4. The resilient seat support which embodies my invention includes a post 6 which is secured within the upper end of the seat post tube 1 by a clamping bolt 7 and to the upper end of which is rigidly attached a forwardly extending flat bar 8. A plurality of superimposed leaf springs 9 are fastened at their forward ends to the forward end of the bar 8, whence they extend rearwardly toward and preferably beyond the top of the post 6, the leaf springs 9 being curved upwardly and away from the bar 8 so as to leave a free space between the rear ends of these springs and the bar. The forward end of a small plate 10 rests upon the forward end of the uppermost spring 9, this plate, the springs 9 and the bar 8 being rigidly connected by a pair of screws 11. The forward edge of the plate 10 is bent to surround and support a bolt 12.

Spaced slightly above the upper leaf spring 9 and preferably curved concentrically therewith is a tube 13 extended at its forward end into a flat plate 14 having downturned parallel ears 15, these ears being spaced to straddle the plate 10 and the forward ends of the leaf springs 9 and being pivoted upon the opposite ends of the bolt 12. The rear end of the tube 13 is loosely surrounded by a block 16 having an integral projection 17 which passes through slightly elongated slots 18 formed longitudinally through the rear ends of the leaf springs 9. The projection 17 is provided with a shoulder 19 to receive a washer 20 held against the shoulder by a nut 21 threaded onto the lower end of the projection. A washer 22 of leather, or other suitable material, is interposed between the washer 20 and the lowermost leaf spring 9 so as to reduce any noise caused by vibration. The shoulder 19 is located so as to prevent the washer 20 from pressing tightly against the leaf springs 9 so as to cause them to bind, and the longitudinal elongation of the slots 18 allows the rear ends of the leaf springs 9 to slide upon each other as they are bent downwardly by the weight of the rider. The block 16 maintains the tube 13 and the leaf springs 9 in proper relative positions. The rear end of the tube 13 is extended beyond the leaf springs 9 so that any common form of seat or saddle 23 may be attached to it as by means of a set screw 24, the wall of this portion of the tube 13 being reinforced to withstand the pressure of the set screw.

In order to accommodate the combined strength of the leaf springs 9 to the weight of the rider and to the character of the surface over which the machine is to be ridden, the number of leaf springs 9 may be varied at will, it being a simple matter to add or remove these springs after removing the screws 11. As the rear ends of the leaf springs 9 are depressed by the weight of the rider, the resistance of these springs increases because their effective length is continually growing shorter as they are bent more and more into contact with the bar 8. Therefore, when the proper number of leaf springs 9 is used, they will furnish a support for the seat which will be very resilient and comfortable under normal riding conditions, without permitting the seat or its support, however, to strike any rigid stop so as to jar the rider even while passing over very uneven surfaces.

While I have described the details of a form of my invention adapted to be interposed between the frame and seat of a machine, I do not wish to be limited to such details as it is obvious that some features of the invention may be embodied in other forms of seat supporting structures; but

Having thus described my invention, what I claim as new and desire to secure by Letters Patent is:

1. A seat support including a bar, a spring secured at its forward end to the forward end of the bar and separated from the bar at its rear end, and seat carrying means pivotally connected to the forward end of the bar and with its rear end supported by the spring, said seat carrying means being constructed and arranged to support a seat entirely at its rear end.

2. A seat support including a rigid bar, a spring secured at its forward end against the forward end of the bar and diverging gradually from the bar toward its rear end, and seat carrying means supported by the rear end of the spring.

3. A seat support including a rigid bar, a spring secured at its forward end against the forward end of the bar and diverging gradually from the bar toward its rear end to leave a space between them, and a seat carrying member with its forward end pivotally connected to the forward end of the bar and with its rear end supported by the spring.

4. A seat support including a bar, a plurality of superimposed springs attached at their forward ends to the forward end of the bar and separated from the bar at their rear ends, and seat carrying means supported by the rear ends of the springs, one of the springs being removable to vary the resiliency of the support.

5. A seat support including a bar, a spring attached at its forward end to the forward end of the bar and separated from the bar at its rear end, a seat carrying member with its forward end pivotally connected to the forward end of the bar, and a connection between the rear ends of the seat carrying member and spring to maintain them in proper relative positions.

6. A seat support including a bar, a plurality of springs attached at their forward ends to the forward end of the bar and separated from the bar at their rear ends, a seat carrying member with its forward end pivotally connected to the forward end of the bar, a block loosely engaging the rear end of the seat carrying member and having a projection, the rear ends of the springs having openings larger than the projection to receive it, and means for retaining the projection within the openings.

7. A seat support including a bar, a plurality of superimposed springs with their forward ends resting on the forward end of the bar, a plate resting on the forward end of the uppermost spring, means for securing the plate and springs to the bar, a pivot carried by the plate, and a seat carrying member with its forward end supported by the pivot and with its rear end supported by the rear ends of the springs, the springs being removable to vary the resiliency of the support.

Dated this twelfth day of December 1913.

LYMAN H. COBB.

Witnesses:
PENELOPE COMBERBACH,
NELLIE WHALEN.